(12) United States Patent
Watkins (10) Patent No.: US 11,119,681 B2
(45) Date of Patent: Sep. 14, 2021

(54) OPPORTUNISTIC COMPRESSION

(71) Applicant: HEWLETT PACKARD ENTERPRISE DEVELOPMENT LP, Westborough, MA (US)

(72) Inventor: Glenn Watkins, Northborough, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 549 days.

(21) Appl. No.: 15/965,904

(22) Filed: Apr. 28, 2018

(65) Prior Publication Data
US 2019/0332302 A1 Oct. 31, 2019

(51) Int. Cl.
| G06F 16/174 | (2019.01) |
| G06F 3/06 | (2006.01) |
| G06F 16/13 | (2019.01) |
| G06F 16/14 | (2019.01) |

(52) U.S. Cl.
CPC .......... *G06F 3/0643* (2013.01); *G06F 3/0604* (2013.01); *G06F 3/0689* (2013.01); *G06F 16/137* (2019.01); *G06F 16/152* (2019.01); *G06F 16/1744* (2019.01)

(58) Field of Classification Search
CPC ............................ G06F 16/152; G06F 16/1744
See application file for complete search history.

(56) References Cited

U.S. PATENT DOCUMENTS

| 8,108,353 | B2 | 1/2012 | Balachandran et al. |
| 9,176,978 | B2 | 11/2015 | Wideman |
| 9,626,373 | B2 | 4/2017 | Ram |
| 2006/0184505 | A1* | 8/2006 | Kedem ................. G06F 3/0608 |
| 2009/0319547 | A1* | 12/2009 | Hollis ................. G06F 16/1744 |
| 2014/0201175 | A1* | 7/2014 | Ohno ................... G06F 16/1744 |
| | | | 707/693 |
| 2015/0242309 | A1* | 8/2015 | Talagala ................ G06F 3/0679 |
| | | | 711/103 |

(Continued)

OTHER PUBLICATIONS

Daehee Kim et al., "SAFE: Structure-Aware File and Email Deduplication for Cloud-based Storage Systems," IEEE 2nd International Conference on Cloud Networking (CloudNet), 2013 pp. 1-8, IEEE.

(Continued)

*Primary Examiner* — Kris E Mackes
(74) *Attorney, Agent, or Firm* — Hewlett Packard Enterprise Patent Department (57) ABSTRACT

A method for storing data in a storage system, includes opportunistically compressing a plurality of objects of a first size during a write operation, storing the compressed objects of the first size if they compress acceptably, and storing other objects of a second size uncompressed. It further includes determining during a read operation whether an object of the second size is stored as a part of a compressed object; if the object of the second size is not stored as a part of a compressed object of the first size, then reading the object of the second size from storage; if the object of the second size is stored as a part of the compressed object of the second size, then: reading the compressed object of the first size from storage; uncompressing the compressed object of the first size; and extracting the object of the second size.

20 Claims, 8 Drawing Sheets

(56) References Cited

U.S. PATENT DOCUMENTS

2017/0185625 A1* 6/2017 Cheru .................. G06F 16/217

OTHER PUBLICATIONS

Fang Yan and Yuan Tan, "A Method of Object-based De-duplication," Journal of Networks, Dec. 2011, pp. 1705-1712, vol. 6, No. 12, Academy Publisher.
Giridhar Appaji Nag Yasa and P.C. Nagesh, "Space Savings and Design Considerations in Variable Length Deduplication," 2012, pp. 1-8, NetApp, Inc.
Matrazali Noorafiza et al., "Block Length Optimization in Data Deduplication Technique," 2013, pp. 1-5, Tokyo University of Technology, Japan.

* cited by examiner

OPPORTUNISTIC COMPRESSION

BACKGROUND

Today's computing systems handle and store very large amounts of data. Such computing systems use one or more "storage systems" to store the data. Storage systems are computing apparatus whose design has been adapted to store data in large amounts. For example, they usually have lots of storage in the form of multiple Hard Disk Drives ("HDDs") or Solid State Devices ("SSDs") and employ special data handling techniques. One such technique is "object size", in which they break up every piece of information into "objects" of a predetermined size. For example, a storage system might break information up into 64 KiB "objects" or 8 KiB "objects". Another such technique is "compression", where the data is compressed into smaller sizes. There are at least two benefits of using compression: data storage efficiency and wide-area network ("WAN") optimization.

These two techniques intersect in an unfortunate way in the current transition to 4 KiB objects. As the industry moves to 4 KiB data objects, there may be diminishing returns in attempting to compress each individual object. First, devices with 4 KiB native sector sizes provide a natural alignment for using 4 KiB as a minimum object size. Writing less than 4 KiB will either not be allowed or will incur extra overhead within the device to emulate a smaller sector. There are also limits as to how effective compression can be on data objects that small.

BRIEF DESCRIPTION OF THE DRAWINGS

Examples described herein may be understood by reference to the following description taken in conjunction with the accompanying drawings, in which like reference numerals identify like elements.

While examples described herein are susceptible to various modifications and alternative forms, the drawings illustrate specific embodiments herein described in detail by way of example. It should be understood, however, that the description herein of specific embodiments is not intended to be limiting to the particular forms disclosed, but on the contrary, the intention is to cover all modifications, equivalents, and alternatives falling within the spirit and scope of the examples described herein and the appended claims.

DETAILED DESCRIPTION

Illustrative embodiments of the subject matter claimed below will now be disclosed. In the interest of clarity, not all features of an actual implementation are described in this specification. It will be appreciated that in the development of any such actual embodiment, numerous implementation-specific decisions will be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

As discussed above, the industry's current move to 4 KiB object sizes will have unfortunate consequences for compression. The unit of measure for a "KiB" is a Kibibyte, and the 4 KiB is, more particularly, 4096 bytes. Other units of measure such as "kilobyte" may also be appropriate in some contexts. Table 1 shows the effectiveness of compression with various object sizes on a sample of highly compressible data, xml text files. Analysis of this data also showed this effect to be unique across each of the object sizes so there would be no benefit from object deduplication.

TABLE 1

Compression Effectiveness by Object Size

| Object Size | Compressed Size | 512-byte Sector Savings | 4096-byte Sector Savings |
| --- | --- | --- | --- |
| 4 KiB | 2.5 KiB | 38% | 0% |
| 8 KiB | 3 KiB | 63% | 50% |
| 64 KiB | 7 KiB | 89% | 88% |

More particularly, using 4 KiB objects on 4 KiB sector storage media will not see any benefit from compression for storage efficiency. The compressed data could still be saved within the 4 KiB sector and a raw read from another system node would be able to reduce network bandwidth for that data. The biggest savings can be seen with 64 KiB objects where both data storage and network bandwidth can achieve nearly a 90% reduction for this workload. If there is an efficient way to manage highly compressed 64 KiB objects, there may be little benefit to compressing 4 KiB objects when the compression/decompression overhead is taken into consideration.

The presently disclosed technique addresses this problem by "opportunistically" compressing the data. The technique creates compressed 64 KiB objects by opportunistically merging sets of adjacent 4 KiB objects. This can be done any time there are enough 4 KiB objects in memory to build an aligned 64 KiB object within a leaf metadata object. For example, large writes will frequently include 64 KiB of aligned data that can be compressed. Similarly, sequential writes where objects can be held in the write buffer cache when sequential workloads are detected may offer such opportunities. Remote backups, as well, where 64 KiB of data is read to be sent to another system node, may offer such opportunities. Use in remote backups will also help promote WAN optimization. Opportunistic compression in remote backups is also desirable because backups may be long lived and compressing this data can ensure the system approaches optimal data storage efficiency.

Figure 1:
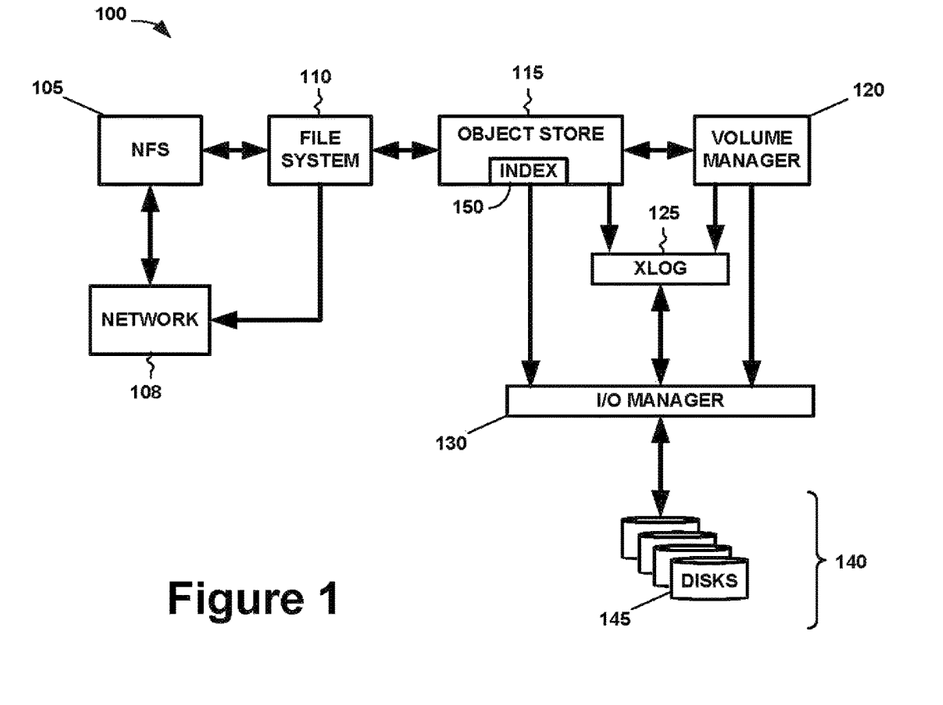
FIG. 1 illustrates one embodiment of a storage system in which the subject matter claimed below may be employed and which is used to illustrate the subject matter.

Turning now to FIG. 1, an example storage system 100 in the context of which the subject matter claimed below will be discussed. The storage system 100 may be an example of a Hyper Converged Infrastructure ("HCI") system. One characteristic of HCI systems is that they virtualize the storage area network and the underlying storage abstractions in software. This generally promotes hardware compatibility in large networks such as WANs even in the presence of widely divergent hardware.

The storage system 100 includes a Network File System ("NFS") interface 105 that provides a front end file access protocol. The NFS protocol employs a distributed file system that permits a user on a client to access files over a network 108 in the same manner they access local storage. NFS is an open standard. The NFS 105 communicates bi-directionally for reads and writes with the network 108. The network 108 is not a part of the storage system 100. The storage system 100 also includes an internal file system 110. The file system 110 includes a demuxer providing a data-store/export presentation, a high availability filesystem network communication capability, and a filesystem providing a directory/file structure management that translates a file offset into an object signature, none of which are separately shown.

The storage system further includes an object store 115, a volume manager 120, an XLog 125, an input/output ("I/O") manager 130, and a plurality of disks 145 that constitute a storage 140. The object store 115 is a key-value store and the generation of the index 150 will be discussed below in connection with FIG. 3. The object store 115 provides object-level deduplication based on object signature. The volume manager 120 provides storage block allocation management. The XLog 125 provides transactional data structure persistence. The I/O manager 130 provides low level disk management. The disks 145 may be any suitable disk known to the art, such as a HDD or a SSD and may be organized in any suitable fashion. The operation of most of the storage system 100 is not directly pertinent to the subject matter claimed below. Accordingly, those details are omitted so as not to obscure that which is claimed.

Figure 2:
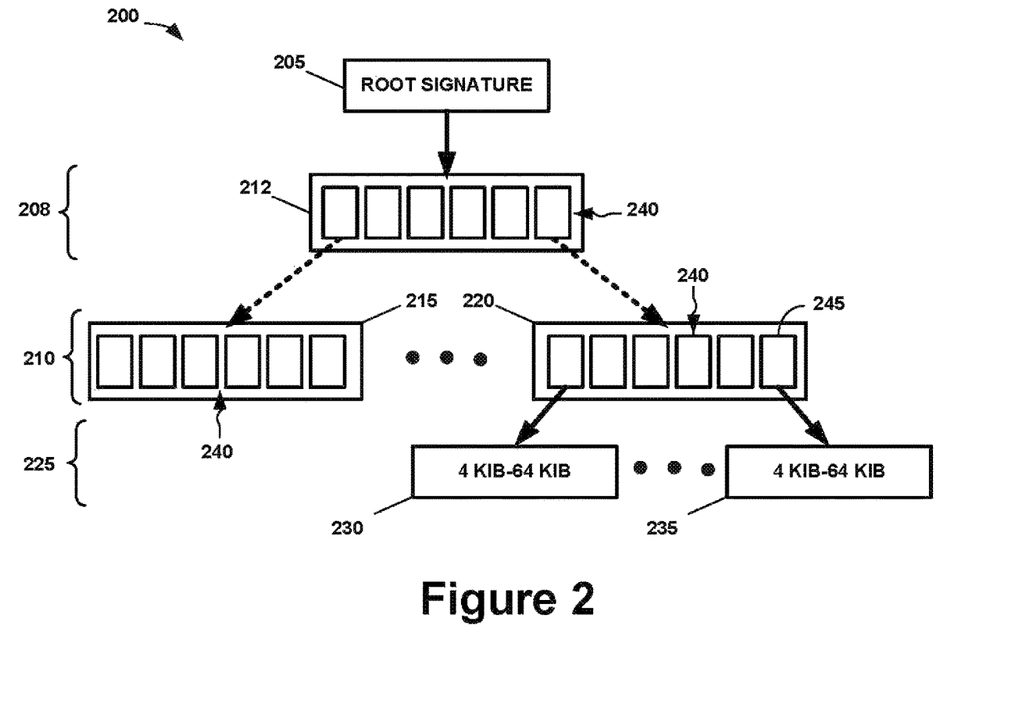
FIG. 2 depicts selected portions of a tree structure as may be used in one particular embodiment.

Data is stored on the disks 145 using Merkle trees, such as the data tree 200 shown in FIG. 2, managed by the file system of the file system 110. In other implementations, the data may be related in other hierarchical arrangements, such as directed acyclic graphs and the like. A Merkle tree is one in which the leaf nodes are labeled with a hash of a data block and the internal nodes are labeled with a cryptographic hash of its child nodes. Because it will be used subsequently in this detailed description, the discussion will now turn to nomenclature regarding various elements in the data tree 200.

In FIG. 2, the data tree 200 starts with the root node 205. The root node 205 contains the root signature, which is how the data tree 200 is identified and located during operations. The data tree 200 also includes two layers 208, 210 of internal nodes 212, 215, 220. Note that not all the internal nodes of the row 210 are shown. These are "internal" nodes because they are not the root node 205 and are not in the lowest row 225 of the data tree 200. The lowest row 225 of the data tree 200 contains the leaf nodes 230, 235. Note that not all the leaf nodes in the lowest row 225 are shown.

As noted above, the data tree 200 includes two layers 208, 210 of nodes. Other embodiments may have as few as one or more than two. The number of such layers 208, 210 will depend on the addressable range of the tree.

In addition to being identified as "internal" and "leaf" nodes, nodes may be identified as "parent" and "child" relative to one another. A "parent node" is the internal node that points to a "child node". Note that internal nodes may be both a parent node and a child node at the same time. Leaf nodes are always child nodes. So, in FIG. 2, the internal node 212 is the parent node for both of the internal nodes 215, 220, which are child nodes of the internal node 212.

The internal node 220 in the parent node to the leaf nodes 230, 235, which are child nodes of the internal node 220. Note that the internal node 220 is both a parent node to the leaf nodes 230, 235 and a child node to the internal node 212.

The leaf nodes 230, 235 in the lowest layer 225 of the data tree 200 contain user data, or data that may be used to fill user requests. The internal nodes 212, 215, 220 in the rows 208, 210 contain metadata, which is data used to navigate the data tree 200 to locate the user data in the leaf nodes 230, 235 of the lowest row 225. One term that will be used below is "leaf meta-node". "Meta-node" indicates that the node contains metadata and "leaf" indicates that the node is in the lowest row of nodes containing metadata. Thus, in FIG. 2, the internal nodes 215, 220 are also "leaf meta-nodes".

Figure 3:
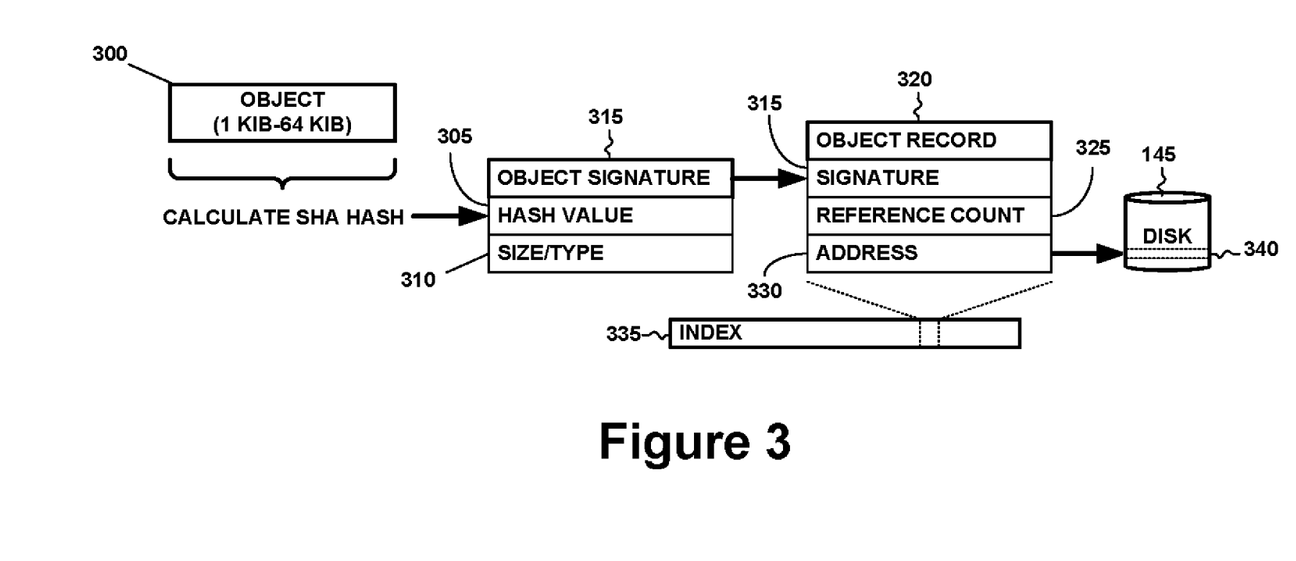
FIG. 3 illustrates concepts associated with the storage in the storage system of FIG. 1.

Everything in the data tree 200 is managed as an object, including both user data and metadata. In an example implementation, metadata is managed as a 1 KiB object whereas user data is managed in 4 KiB-64 KiB objects in powers of two. Each of these objects is addressed by a signature that is a cryptographic hash. The object signature is generated and used as shown in FIG. 3. More particularly, FIG. 3 illustrates the Index 150 of the object store 115, both shown in FIG. 1. The index 150 is a large hash table of object records searchable by signature.

In FIG. 3, an object 300 is assigned a hash value 305 using a cryptographic hash function, such as a secure hash algorithm ("SHA"). The hash value 305 may be combined with the size and type 310 of the object to generate the object signature 315. The object signature 315 then becomes a part of the object record 320, along with a reference count 325 and an address 330. The address 330 is translated into the index 335 to reference a specific location 340 on a disk 145.

Returning to FIG. 2, as discussed above, the internal nodes contain metadata, may be considered "meta nodes", and are handled as objects. Each of the internal nodes 212, 215, 220 includes an array 240 of child object signatures 245 (only one indicated). In the illustrated embodiment, each array 240 comprises six child object signatures 245. However, the structure of the internal nodes 215, 220, which are "leaf meta-nodes" as described above, are modified to accommodate the opportunistic compression technique disclosed herein.

Figure 4:
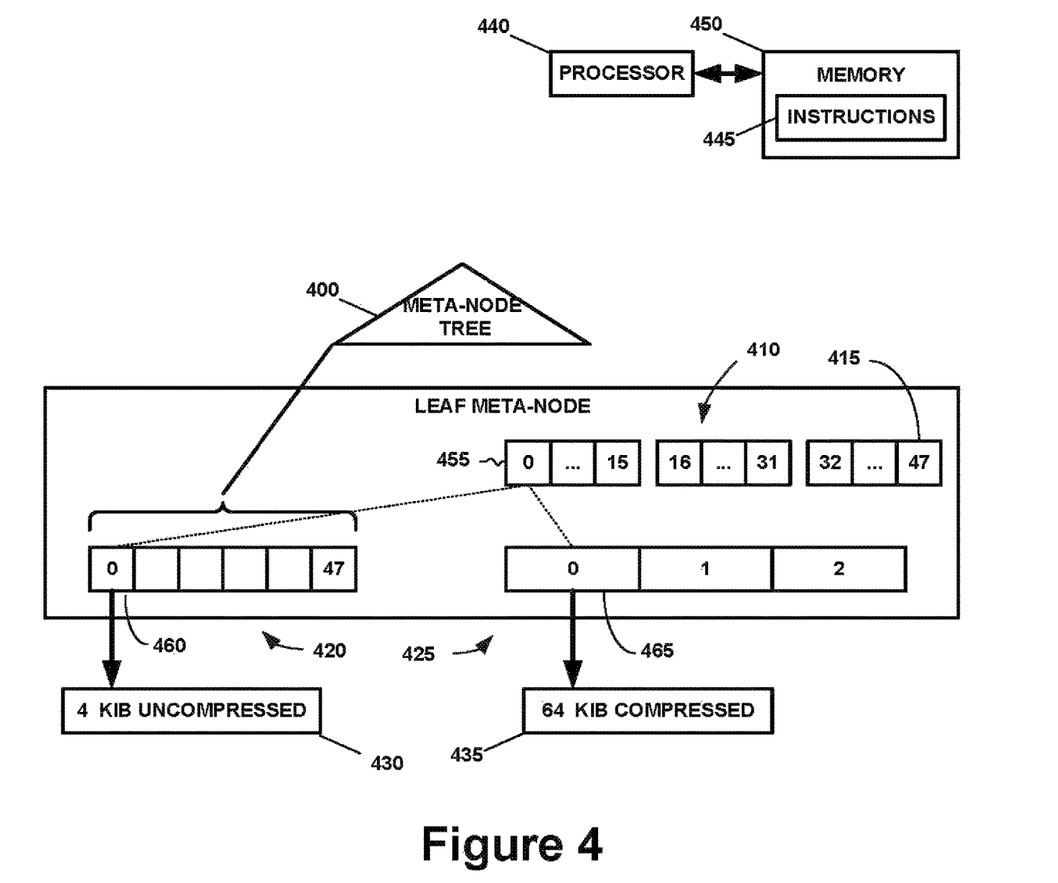
FIG. 4 illustrates selected portions of the tree structure of FIG. 2 as used In one or more embodiments as well as the hardware that may execute the discussed functionalities in one or more embodiments.

Turning now to FIG. 4, the structure of a "leaf meta-node" (e.g., the internal nodes 212, 215) is illustrated. The rest of the data tree 200 is symbolically represented by the "meta-node tree" 400. The representative leaf meta-node 405 includes a bitset 410 of look-aside compression bits 415 (only one indicated). In this embodiment, there are 48 look-aside bits also labeled 0-47. The representative leaf meta-node 405 also includes two arrays 420, 425. The array 420 contains a plurality of signatures for child nodes in which user data is stored as uncompressed, 4 KiB objects 430. The array 425 contains a plurality of signatures for child nodes in which user data is stored in compressed objects 435 of up to 64 KiB. That is, 64 KiB of data compressed to some lesser amount and stored in a child node.

In the illustrated embodiment, the 64 KiB of data is compressed to some amount that is a power of 2 not to exceed 64 KiB. This is an implementation specific detail and may vary in alternative embodiments. This feature of the illustrated embodiment is a artifact of the manner in which the volume manager 120 allocated space for data. Alternative embodiments may implement this in different ways.

The read and write functionality about to be described is performed by a processor 440 executing instructions 445 residing on a memory 450. The processor 440 and memory 450 may be or form part of the I/O manager 130 shown in FIG. 1. The processor 440, in some embodiments, may be a memory controller in the I/O manager 130. In other embodiments, the processor 440 may be a separate compression manager (not shown) in the I/O manager 130. Note that various embodiments may use different processors from different elements of the storage system depending on implementation specific details. The data tree 200, shown in FIG. 2, may also reside in the memory 450 of the I/O manager 130, although this is not shown. These are implementation specific details that may vary across different embodiments and should be readily implemented by those in the art having the benefit of this disclosure.

Still referring to FIG. 4, the look-aside bits 415 in the bitset 410 indicate whether a given 4 KiB object has been part of a compressed 64 KiB object. During write operations the processor 440 looks for opportunities to compress multiple, aligned 4 KiB objects as described above. If such an opportunity is found, the look-aside bits 415 for the 4 KiB objects that are compressed are set, the signatures in the array 425 are calculated from the uncompressed data used in the "pseudo intents" described below for object signature generation, and the compressed 4 KiB objects are stored as 64 KiB compressed objects 435. So, for example, if the first 4 KiB object in the leaf meta-node is not compressed, the first look-aside bit 455 is cleared or set to "0", the 4 KiB object is stored in the 4 KiB uncompressed 430 storage, and the signature 460 calculated accordingly. If the first 4 KiB object is compressed, the first look-aside bit 455 is set to "1", the 4 KiB object is stored in 64 KiB compressed storage 435, and the signature 465 calculated accordingly.

Each leaf meta-node contains references to objects that consume 192 KiB of data. The presently disclosed method divides the 192 KiB capacity into three compressed objects that each represent 64 KiB of data. When the entirety of one of those 64 KiB objects is available in memory, either from a large write or sequential pattern that has placed the data in an available cache, there is an opportunity to merge all of the smaller 4 KiB objects into the large one. Hence, the term "opportunistically"-compression is not always performed, but when an opportunity presents itself.

A large 64 KiB aligned write request will line up on the 64 KiB object boundary. That can be easily determined if the request offset modulo 64 KiB equals zero. For example, a 64 KiB request at offsets 0, 64 KiB, 128 KiB, or 192 KiB would all be considered aligned. A 64 KiB write request at offset 32 KiB would not be. In that case, the request would span across our 64 KiB object boundary and not all of the data will be available for either of them. Requests larger than 64 KiB may have a mix of object alignments. For example, a 128 KiB request at offset 32 KiB, would end up with a complete 64 KiB object in the middle with 32 KiB dangling on each end.

During read operations, the processor 440 first reads the look-aside bit 455 to see if a particular 4 KiB object has been stored uncompressed or compressed. If the look-aside bit 455 is cleared, then the processor 440 checks the signature 460 in the array 420 and reads the 4 KiB object. If the look-aside bit 455 is set, then the processor 440 checks the signature 465, decompresses the 64 KiB compressed object, and reads the 4 KiB object.

Figure 5:
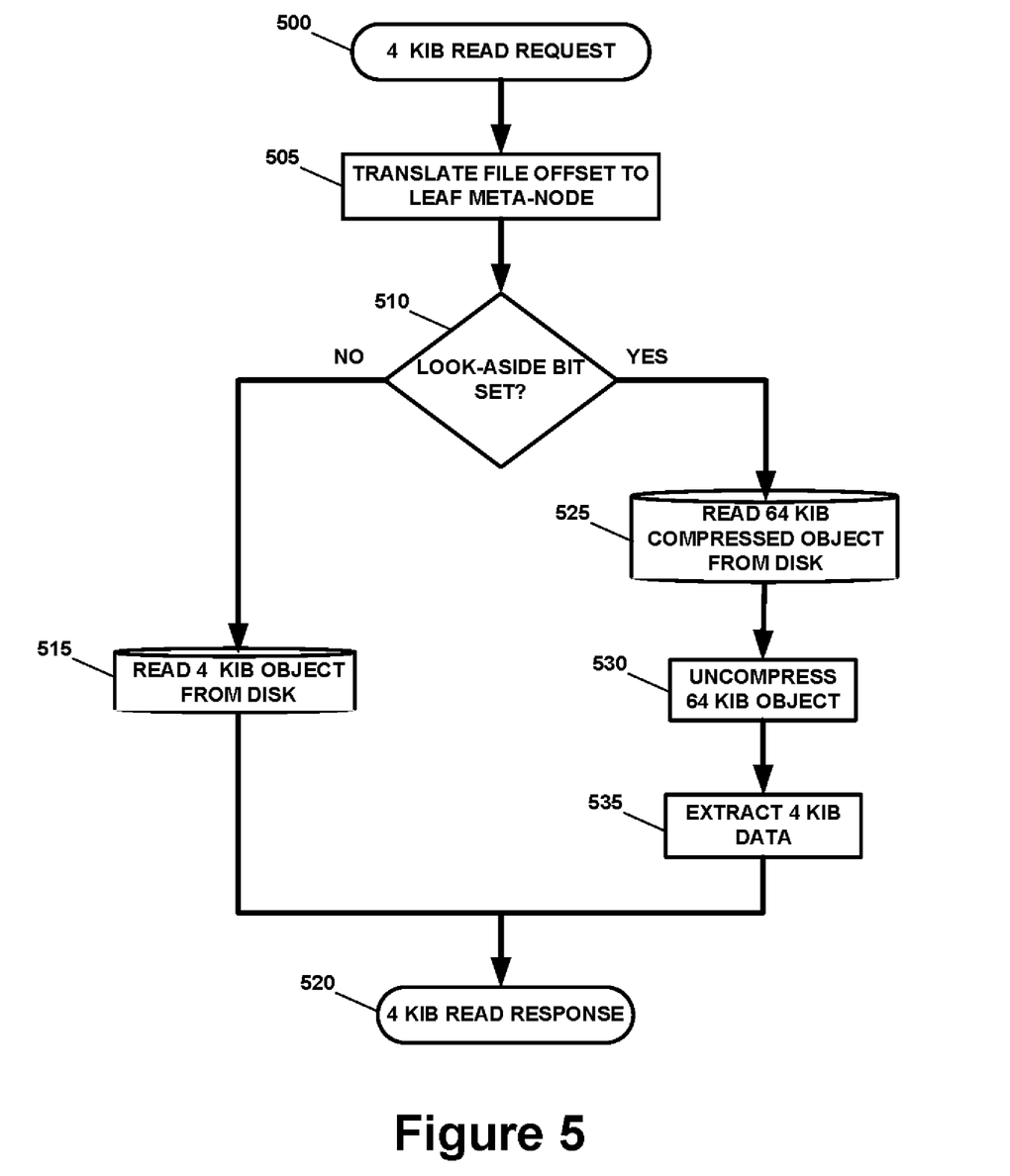
FIG. 5 is a flow chart of a 4 KiB read request in accordance with one or more embodiments.

FIG. 5 is a flow chart illustrating a read operation in greater detail. When the filesystem 110, shown in FIG. 1, reaches the leaf metadata node 400 containing the object, the filesystem 110 will look up the location in the respective look-aside bitset 410. If the bit 415 is set, the object is contained within a larger compressed object. That 64 KiB object will then be read from disk, uncompressed, and the smaller object extracted. If this look-aside bit 415 is not set, the uncompressed object is read directly from disk. Large and sequential reads will have the benefit of retrieving much less data from disk and with only a single request. Small random reads may have additional overhead to read slightly more data from disk and decompress in memory.

More particularly, the read operation begins with a 4 KiB read request (at 500). The file system 110 translates (at 505) the file offset for the 4 KiB object to a leaf meta-node indicating its storage location on disk as illustrated in FIG. 3. If the look-aside bit is not set, then the 4 KiB object is read (at 515) from disk and the 4 KiB read response (at 420) to the 4 KiB read request (at 500) is filled. If the look-aside bit 415 is set (at 510), then the 64 KiB object is read (at 525), the 64 KiB object is uncompressed (at 530), and the 4 KiB data object is extracted (at 535) and read. The 4 KiB read response is then filled (at 520).

Figure 6:
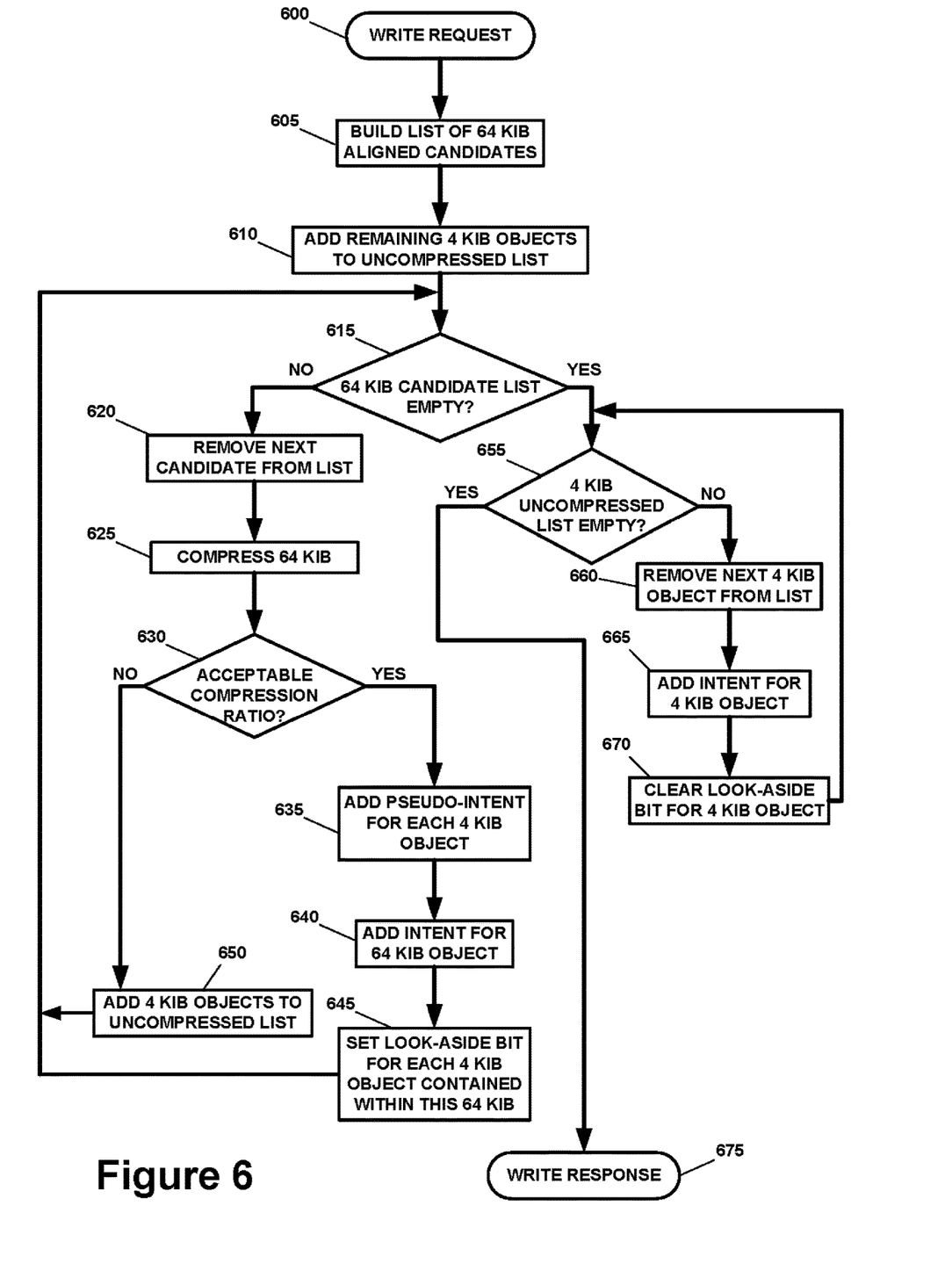
FIG. 6 is a flow chart of a write request in accordance with one or more embodiments.

FIG. 6 is a flow chart illustrating a write operation in greater detail. Writing a new 4 KiB object will behave as the write operation does in conventional practice with respect to adding an intent log entry, but will also ensure that the compression look-aside bitset is cleared for that location. An "intent" is an entry in an "intent log" associated with the leaf meta-node and indicates an update to a child node to the leaf meta-node. The intent log is stored in persistent memory, and accumulates the intents until they reach some predefined threshold. The accumulated intents are then implemented at the same time in a process called "roll-up" discussed below.

Object signatures are generated for each 4 KiB object in the large block per usual, but those will use "pseudo intents" that are placeholders for the signatures to be used during roll-up and not hold references to those objects. Pseudo-intents are similar to intents, but do not represent any changes to disk. Instead, a 64 KiB object is added to the object store 115, shown in FIG. 1, an associated intent log entry is created, and the look-aside bit(s) for each of the 4 KiB objects being represented is set.

The write operation begins upon receiving (at 600) a write request. A list is built (at 605) of 64 KiB aligned candidates in the block to be written. Another list is then built (at 610) from remaining 4 KiB object not on the compression candidate list. An iterative process is then begun (at 615) for processing the compression candidate list. If the compression candidate list is not empty, the next compression candidate is removed (at 620) from the list and compressed (at 625). If the compression (at 625) yields an acceptable compression ratio (at 630), then a pseudo-intent for each 4 KiB object is added (at 635) to the logs, an intent is added (at 640) for each 64 KiB object, and the look-aside bit for each 4 KiB object within the 64 KiB object is set (at 645). If the compression (at 625) does not yield an acceptable compression ratio (at 630), then the 4 KiB objects composing the candidate 64 KiB object are added to the uncompressed list (at 650).

Once the compression candidate list is empty (at 615), the uncompressed list is iteratively processed. If the uncompressed list is not empty (at 655), the next 4 KiB object on the list is removed (at 660), an intent is added (at 665) to the logs for the candidate, and the look-aside bit for the 4 KiB object is cleared (at 670). The iteration continues until the uncompressed list is empty (at 655), whereupon the write response is filled (at 675).

Reference is made above to an "acceptable" compression ratio. What is acceptable is an implementation specific detail and may vary in different embodiments. In one particular embodiment, where the compressed data is less than about 32% of the uncompressed, this is acceptable. In general, however, less that about 50% may be acceptable in most embodiments.

As noted above, changes made during write operations are accumulated and "rolled up" at the same time. Each change is documented as an "intent" in the intent log. This includes changes to 4 KiB objects and 64 KiB objects. Rolling up individual 4 KiB object intents to offsets that also have a compressed object will need to track how many of those look-aside bits have been cleared. Once a threshold is reached (e.g., 50%) where a specified percentage of the data within the compressed object has been overwritten (e.g., 50%), the compressed object can be broken back into the remaining 4K objects and discarded. Each of those newly uncompressed 4 KiB objects will need to be added with references to the index 150 of the object store 115, shown in FIG. 1, and the compressed object they are replacing will have the reference count decremented.

A 64 KiB compressed object being added will hold a single reference for each of the 16 4 KiB objects contain therein. During a roll-up for an active tree, any "pseudo intents" representing the 4 KiB objects provide signatures to be used when generating the new leaf node signature and the compressed object intent reference will be transferred to the new leaf object. If the compressed object is being added to a static tree during a backup operations, the leaf meta-node data will need to be replaced on disk and have the children's reference counts adjusted to account for the compressed object, but the signature of the leaf node remains the same because the signature of the leaf meta-node is always calculated using the 4 KiB uncompressed child signatures.

Figure 7:
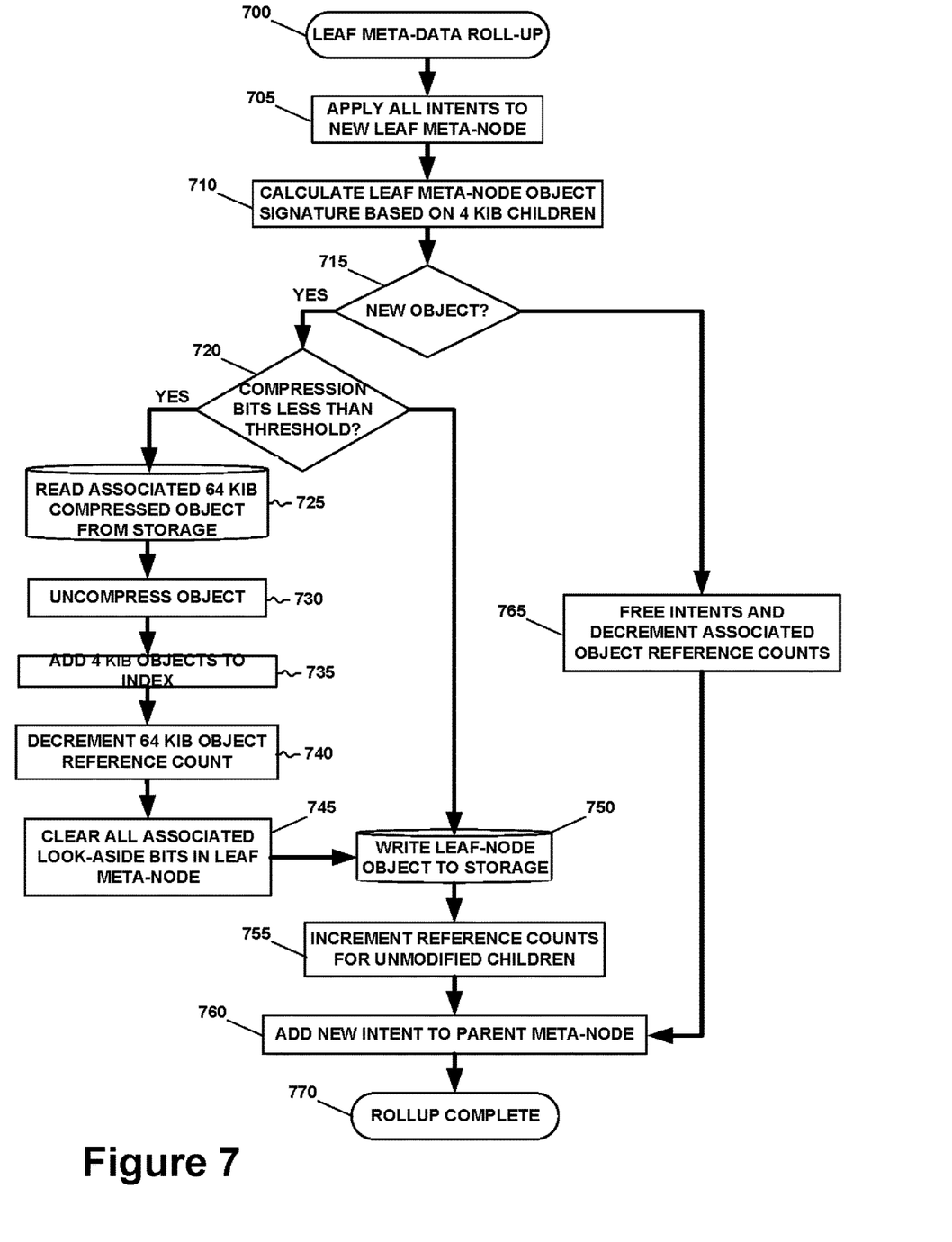
FIG. 7 is a flow chart of a roll-up process in accordance with one or more embodiments.

FIG. 7 is a flow chart of a roll-up operation. As noted above, a roll-up is performed whenever a threshold is reached. In the illustrated embodiment, a roll-up is performed whenever more than 50% of the children of the leaf meta-node have been modified as indicated by the intent log. However, this may vary in alternative embodiments.

The roll-up (at 700) begins by applying (at 705) all the intents in the intent log to the new leaf meta-node and calculates (at 710) leaf meta-node object signature based on the 4 KiB children. If there is a new object (at 715), and the number of set look-aside bits is less than a predetermined threshold (at 720), then the associated 64 KiB object is read (at 725). The read 64 KiB object is then uncompressed (at 730), the 4 KiB objects added (at 735) to the Index 150, the 64 KiB object reference count is decremented (at 740), and the associated look-aside bits are cleared (at 745). The new leaf meta-node object is the written to storage (at 750), the reference counts are incremented (at 755) for unmodified children, and a new intent is then added (at 760) to the parent meta-node. If there is not a new object (at 715), the intents are freed (at 765) and the associated object reference counts are decremented (also at 765). A new intent is then added (at 760) to the parent meta-node.

The roll-up operation for this meta-node is then completed (at 770). The roll-up operation in FIG. 7 is performed on a node-by-node basis. (So, too, are the read and write operations of FIG. 5 and FIG. 6.) The roll-up operation is performed for each node in a row of the tree, and then for each node in the row above that row, and so on until the root node is reached. The read, write, and roll-up operations in FIG. 5, FIG. 6, and FIG. 7 may be performed in hardware or in high speed software processes or by a combination of hardware and software.

Figure 8:
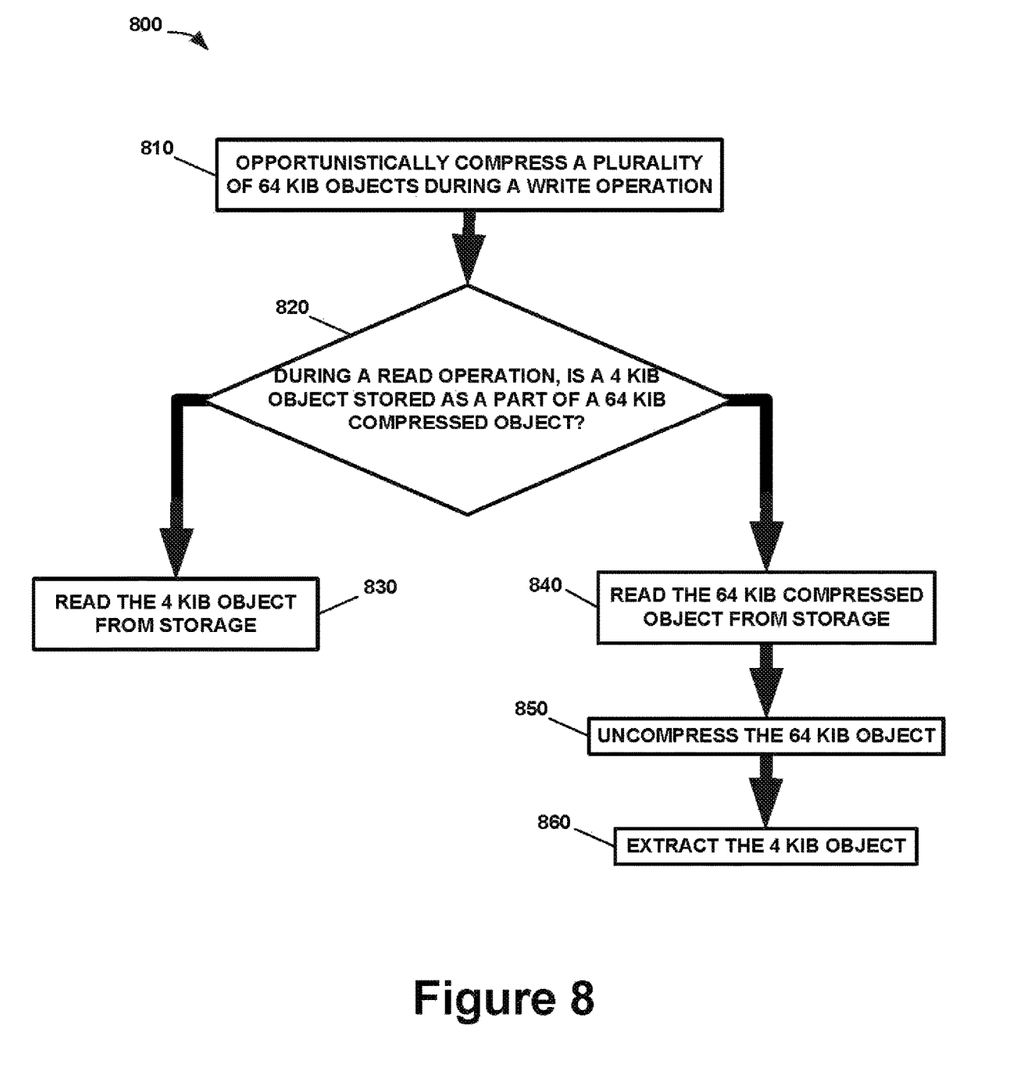
FIG. 8 illustrates one particular embodiment of a method.

Accordingly, in one aspect, the claimed subject matter includes a method 800 for storing data in a storage system and shown in FIG. 8. The method includes opportunistically compressing (at 810) a plurality of 64 KiB objects during a write operation. The method 800 then determines (at 820) during a read operation whether a 4 KiB object is stored as a part of a compressed 64 KiB object. If the 4 KiB object is not stored as a part of a compressed 64 KiB object (at 830), then the 4 KiB object is read from storage. If the 4 KiB object is stored as a part of a compressed 64 KiB object (at 820), then the compressed 64 KiB object is read from storage (at 840); uncompressed (at 850), and the 4 KiB object is extracted (at 860). The method 600 in FIG. 6 is one way in which the method 800 may be implemented.

The disclosure up to this point has described the opportunistic compression in terms of 4 KiB objects and 64 KiB objects. However, the technique may be adapted for use with object sizes differing from 4 KiB and 64 KiB as long as the leaf meta-node signatures are generated based on the same uncompressed data object size. The compressed object used in the lookaside can be of any size up to the maximum addressable by that leaf meta-node. That compressed object size could even be different across leaf meta-nodes within the same tree since that data is not used in the parent signature calculation.

Figure 9:
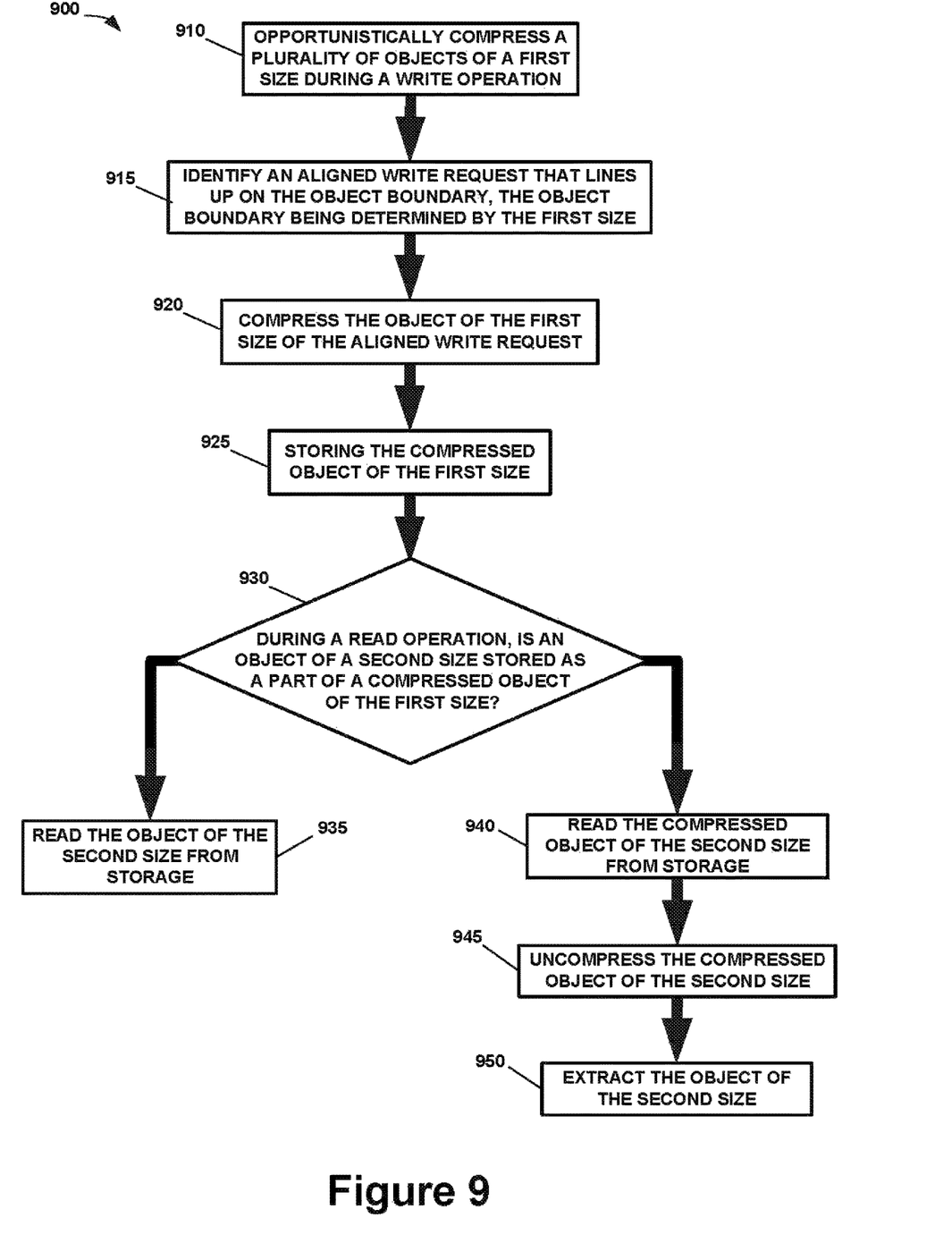
FIG. 9 illustrates one particular embodiment of a method.

Accordingly, FIG. 9 illustrates a method 900 practiced in accordance with one particular embodiment. The method includes 900 opportunistically compressing (at 910) a plurality of objects of a first size during a write operation. This includes identifying (at 915) an aligned write request that lines up on the object boundary, the object boundary being determined by the first size; compressing (at 920) the object of the first size of the aligned write request; and storing (at 925) the compressed object of the first size. The method 900 also includes determining (at 930) during a read operation whether an object of the second size is stored as a part of a compressed object of the first size. If the object of the second size is not stored as a part of a compressed object of the first size (at 930), then the object of the second size is read from storage (at 935). If the object of the second size is stored as a part of the compressed object of the second size (at 930), then: the compressed object of the first size is read (at 940) from storage; uncompressing the compressed object of the first size (at 945); and extracting the object of the second size (at 950).

One of the issues with using multiple object sizes within some filesystems is that the hash tree may be based on the hashes of data objects within the leaf metadata nodes and if the data objects change from one size to another, this would amplify up the entire tree even though the tree still represents the same data. There are two problems with this. First, there is overhead associated with rolling the hash updates through the tree. Second, it relies on the hash tree structure to identify branches representing duplicate data while optimizing data movement between trees across the cluster. The presently disclosed technique addresses both of those problems using the same object size for calculating metadata hashes. Data being written into the filesystem is consistently hashed using 4 KiB objects. Additional signatures for compressed 64 KiB objects can be stored in the metadata object without affecting the metadata signature.

Some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities that will physically transform the particular machine or system on which the manipulations are performed or on which the results are stored. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "accessing", "computing," "calculating," "determining," "displaying," and the like.

Furthermore, the execution of the software's functionality transforms the computing apparatus on which it is performed. For example, acquisition of data will physically alter the content of the storage, as will subsequent processing of that data. The physical alteration is a "physical transformation" in that it changes the physical state of the storage for the computing apparatus.

Note also that the software implemented aspects of the subject matter claimed below are usually encoded on some form of program storage medium or implemented over some type of transmission medium. The program storage medium is a non-transitory medium and may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium. The claimed subject matter is not limited by these aspects of any given implementation.

This concludes the detailed description. The particular embodiments disclosed above are illustrative only, as examples described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the appended claims. Accordingly, the protection sought herein is as set forth in the claims below.

What is claimed is:

1. A method for storing data in a storage system, comprising:
   opportunistically compressing a plurality of objects of a first size during a write operation, including:
      identifying an aligned write request that lines up on the object boundary, the object boundary being determined by the first size;
      compressing the object of the first size of the aligned write request; and
      storing the compressed object of the first size;
   determining during a read operation whether an object of the second size is stored as a part of a compressed object of the first size;
   if the object of the second size is not stored as a part of a compressed object of the first size, then reading the object of the second size from storage; and
   if the object of the second size is stored as a part of the compressed object of the first size, then:
      reading the compressed object of the first size from storage;
      uncompressing the compressed object of the first size; and
      extracting the object of the second size.

2. The method of claim 1, wherein the object of the first size is a 64 KiB object and the object of the second size is a 4 KiB object.

3. The method of claim 1, further comprising:
   opportunistically compressing a plurality of objects of a third size during a write operation;
   determining during a read operation whether an object of the second size is stored as a part of a compressed object of the third size;
   if the object of the second size is not stored as a part of a compressed object of the third size, then reading the object of the second size from storage; and
   if the object of the second size is stored as a part of the compressed object of the second size, then:
      reading the compressed object of the third size from storage;
      uncompressing the compressed object of the third size; and
      extracting the object of the second size.

4. The method of claim 3, further comprising:
   identifying an aligned write request that lines up on the object boundary, the object boundary being determined by the third size;
   compressing the aligned write request; and
   storing the compressed object of the third size.

5. The method of claim 1, wherein aligned write request is aligned if the request offset modulo of the first size equals zero.

6. The method of claim 1, wherein opportunistically compressing the plurality of objects of the first size includes:
   identifying objects of the first size as candidates for compression;
   adding an intent for each object of the first size that meets a predetermined acceptable compression ratio and a pseudo-intent for each object of the second size comprising each of objects of the first size meeting the predetermined acceptable compression ratio;
   adding an intent for each object of the second size that is not a part of a compressed object of the first size; and
   setting a look aside for each bit to indicate whether each object of the second size will be stored as an uncompressed object of the second size or part of a compressed object of the first size.

7. The method of claim 6, wherein determining during the read operation whether the object of the second size is stored as a part of a compressed object of the second size includes checking a respective one of a plurality of look-aside bits.

8. The method of claim 1, wherein determining during the read operation whether the object of a second size is stored as a part of a compressed object of the second size includes checking a respective one of a plurality of look-aside bits.

9. A method for using opportunistic compression in a data set during storage operations, the method comprising:

opportunistically compressing a plurality of objects of a first size during a write operation;

storing a compressed object of the first size including a plurality of compressed objects of a second size in the data set;

storing an uncompressed object of the second size in the data set;

maintaining a bitset of look-aside bits indicating whether a particular object of the second size is stored uncompressed or as a part of the compressed object of the first size; and maintaining a first array of object signatures including the object signature of the compressed object of the first size; and maintaining a second array of object signatures including the object signature of the uncompressed object of the second size.

10. The method of claim 9, wherein the object of the first size is a 64 KiB object and the object of the second size is a 4 KiB object.

11. The method of claim 9, wherein maintaining the bitset includes setting a respective one of the look-aside bits when an object of the second size is stored as a part of a compressed object of the first size and clearing the respective one of the look-aside bits when the object of the second size is stored uncompressed.

12. The method of claim 9, further comprising a read operation including:
determining whether a look-aside bit indicates whether an object of the second size was stored uncompressed;
if the object of the second size was stored uncompressed, then reading the uncompressed object of the second size from disk;
if the object of the second size was stored compressed, then:
reading the compressed object of the first size containing the stored object of the second size from disk;
uncompressing the compressed object of the first size; and
extracting the object of the second size; and
performing the read response.

13. The method of claim 9, wherein the method further comprises a write operation, including:
identifying objects of the first size as candidates for compression;
adding an intent for each object of the first size that meets a predetermined acceptable compression ratio and a pseudo-intent for each object of the second size comprising each of objects of the first size meeting the predetermined acceptable compression ratio;
adding an intent for each object of the second size that is not a part of a compressed object of the first size; and
setting a look aside bit for each object of the second size to indicate whether it will be stored as an uncompressed object of the second size or part of a compressed object of the first size.

14. The method of claim 13, wherein the uncompressed objects of the second size and the compressed objects of the first size are written to storage as part of a roll-up process.

15. The method of claim 13, wherein the method further comprises a write operation including:

building a compressed list of objects of the first size that are candidates for compression;

building an uncompressed list of objects of the second size that will be stored uncompressed;

iteratively analyzing each object of the second size in the compressed list, each iteration including:
compressing each object of the second size;
if the compressed object of the second size meets a predetermined acceptable compression ratio, then:
adding a pseudo-intent for each object of the second size in the compressed object of the second size;
adding an intent for the compressed object of the second size; and
setting a respective one of the look-aside bits for each of the objects of the second size in the compressed object of the first size; and
if the compressed candidate of the second size fails to meet the predetermined acceptable compression ratio, then adding the objects of the second size of the object of the second size to the uncompressed list; and iteratively processing each object of the second size on the uncompressed list, including:
adding an intent for each object of the second size; and
clearing a respective one of the look-aside bits.

16. A storage system, comprising:
a memory;
a storage in which, during operation, objects of a first size and objects of a second size reside;
a data tree residing in the memory during operation and indexing into the storage, the data tree including a plurality of leaf meta-nodes, each leaf meta node including:
a bitset of look-aside bits indicating whether a respective object of the second size has been stored uncompressed or as part of a compressed object of the first size;
an array of object signatures for objects of the second size that have been stored in the storage uncompressed; and
an array of object signatures for objects of the first size that have been compressed and stored in the storage;
a set of instructions residing in the memory; and
a processor that, upon execution of the instructions, builds and maintains the data tree.

17. The storage system of claim 16, wherein the object of the first size is a 64 KiB object and the object of the second size is a 4 KiB object.

18. The storage system of claim 16, wherein the processor, upon execution of the instructions, writes and reads data to the storage.

19. The storage system of claim 16, wherein the storage comprises a plurality of disks.

20. The storage system of claim 16, wherein the object signatures are hashes.

* * * * *